(12) United States Patent
Santhanam et al.

(10) Patent No.: US 8,417,840 B2
(45) Date of Patent: *Apr. 9, 2013

(54) METHODS FOR ANALYZING USB DATA TRAFFIC USING A SINGLE USB HOST CONTROLLER

(75) Inventors: Gopal Santhanam, Sunnyvale, CA (US); Etai Bruhis, Palo Alto, CA (US); Kumaran Santhanam, Sunnyvale, CA (US)

(73) Assignee: Total Phase, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/441,725

(22) Filed: Apr. 6, 2012

(65) Prior Publication Data

US 2012/0246348 A1 Sep. 27, 2012

Related U.S. Application Data

(63) Continuation of application No. 12/416,107, filed on Mar. 31, 2009, now Pat. No. 8,176, 216.

(60) Provisional application No. 61/041,080, filed on Mar. 31, 2008.

(51) Int. Cl.
*G06F 3/00* (2006.01)

(52) U.S. Cl.
USPC .......................................................... 710/15

(58) Field of Classification Search ...................... 710/15
See application file for complete search history.

(56) References Cited

PUBLICATIONS

Catalyst Enterprises Inc. "Conquest Series USB Protocol Analyzers," product specification, 2006.*
Catalyst Enterprises Inc., "Bus & Protocol Analyzers," product specification, 2005.*
"Universal Serial Bus Specification," specification, Apr. 27, 2000.*
Ellisys, "Ellisys USB Explorer 260 Getting Started Guide," manual, Nov. 22, 2007.*
Ellisys, "Ellisys USB Explorer 200 Getting Started Guide," manual, Feb. 13, 2006.*
Ellisys, "Ellisys USB Tracker 110 Getting Started Guide," manual, Feb. 13, 2006.*
Lecroy Corporation. "LeCroy USBTracer™ USB 2.0 Design & Verification System User Manual." user manual, Jul. 2007.*
Hitex, "USB Agent Explores the secrets of USB," brochure, Jun. 2001.*
Lecroy Corporation, "LeCroy Advisor™ USB 2.0 Bus and Protocol Analyzer User Manual," user manual, Jul. 2007.*
Computer Access Technology Corporation, "CATCTM USB Chief™ Bus & Protocol Analyzer User's Manual," user manual, Nov. 9, 2001.*
Lecroy Corporation, "LeCroy USBMobileHSTM Protocol Analyzer User Manual," user manual, Jul. 2007.*

* cited by examiner

*Primary Examiner* — Chun-Kuan Lee
(74) *Attorney, Agent, or Firm* — Van Pelt, Yi & James LLP

(57) ABSTRACT

A method is described for capturing USB data traffic for a monitored device by a USB analyzer using a single USB host controller. It comprises the steps of: generating and storing an address and communication speed associated with the USB analyzer; reading a USB packet; discarding selected read packets based on the stored analyzer address and communication speed; and transmitting the remaining packets to an analysis computer.

21 Claims, 4 Drawing Sheets

METHODS FOR ANALYZING USB DATA TRAFFIC USING A SINGLE USB HOST CONTROLLER

CROSS REFERENCE

This application claims priority from a provisional patent application entitled "Method and Circuits for Analyzing USB Data Traffic Using a Hardware USB Analyzer on a Single USB Host Controller" filed on Mar. 31, 2008 and having an Application No. 61/041,080. Said application is incorporated herein by reference.

FIELD OF INVENTION

This invention relates to methods for analyzing USB data traffic, and, in particular, to methods for capturing USB data traffic using a USB analyzer on a single USB host controller.

BACKGROUND

Universal Serial Bus (USB) is a serial bus standard used for connecting peripheral devices to a host computer. A USB system comprises a USB host, a plurality of downstream USB ports, and one or more peripheral devices. A USB host may have multiple USB host controllers (the "host controllers"), wherein each host controller may provide for one or more USB ports.

Specifically, the USB 2.0 architecture offers high-speed communications, and is capable of connecting multiple devices to a hub that is further connected to a port of the host computer. The USB 2.0 architecture employs a unidirectional broadcast system. In such a system, when a host controller or hub sends a packet, all devices downstream from the originating point of the data will receive the packet. When the host controller communicates with a specific device, it must include the address of the device in the Token packet. Upstream traffic (i.e., the responses from the devices) is only received by the host controller and hubs that are directly connected on the return path to the host controller.

This feature of the USB architecture is especially significant for USB analyzers, which communicate to an analysis computer through the USB system. FIG. 1 illustrates a typical setup for connecting an analyzer to a USB system, wherein the analyzer and a device are connected to the same host controller. An analyzer 12 is setup to monitor the communications between a host controller 10 and a device 14. The analyzer 12 can be setup such that the host controller 10 and the device 14 are unaware of the analyzer's presence on the communication line.

Since the analyzer 12 and the device 14 are connected to the same host controller 10, the analyzer 12 will receive traffic (e.g., packet 16) intended for itself and for the device on the communication port 11 and on the monitor port 15. Since packets intended for the communication port 11 of the analyzer 12 are also perceived on the monitor port 15, this creates a positive feedback loop. Every time the computer requests data from the analyzer 12, it actually creates more traffic on the monitor port 15 to be sent back to the computer. The traffic can overwhelm the user with unnecessary data and will also put unnecessary load on the analyzer's buffer memory and the analysis computer. This is especially true when the analyzer 12 sends large volumes of analysis data back to the analysis computer simultaneously to when the traffic is being captured.

It should be noted that this positive feedback occurs only during particular configurations of the analyzer 12 and device 14 on a single host controller 10. High-speed (HS) communication devices are electrically isolated from full-speed (FS) and low-speed (LS) devices, even if connected to the same host controller. Thus, packets to the analyzer 12 will only be perceived on the monitor port 15 if the monitor port 15 is HS and the communication port 11 is HS, or if they are both not HS.

FIG. 2 illustrates the data traffic at various times for an analyzer and a device on the same host controller. Each connection to the host controller 10 effectively has a logical "Send" and "Receive" unit. All packets sent by the host controller 10 (see times t0 and t2) are received by all attached peripherals (i.e., the device 14 and the analyzer 12). The responses from the peripherals (see times t1 and t3) are only seen on the physical communication interface between the particular peripheral and the host controller 10.

When the host controller 10 sends a packet with the data "PKT2ANL" to the analyzer 12 at time t2, the analyzer 12 receives the packet on its receive logical port (of the communication port 11), as well as on its monitor port 15. Therefore, when the analyzer 12 responds with the monitored data at time t3, that piece of data, "PKT2ANL", is unnecessarily present in the analyzer response. If the host controller 10 is sending many packets to the analyzer 12, then this has the potential of overloading the captured analysis traffic with unnecessary information, and can also take up bandwidth in the analyzer's response at time t3.

Previous products and technologies combated this issue in one of two ways: they either avoided the issue entirely by insisting the user put the USB analyzer on a separate host controller, or they required the user of the analyzer to know the device address of the analyzer beforehand and set up a filter for it.

Using a separate host controller for the analysis computer is optimal in all cases; it reduces the load on that host controller, and allows both the analyzer and the device under test to have more available bandwidth. However, this situation is not always possible or practical, as it requires the user to include additional hardware on the analysis computer or to obtain another USB capable computer; thereby requiring a total of two computers. Therefore, this requirement excludes users from efficiently using the analyzer in such a situation, and does not address the problem.

Some products give the ability to create a hardware filter that will serve a similar purpose. The filter can be configured to discard all data intended for a specific device address. In this way, the analyzer and the device under test can be on the same host controller without overloading the capture buffers. However, these products require the user to know the device address of the analyzer in order to configure the filter. This filter would potentially have to be reconfigured each time the analyzer is used since the device address of the analyzer can change every time it is plugged into a computer. While serving a similar purpose to the present invention, this approach also puts unnecessary strain on the user to maintain the functionality of the filter.

Therefore, it is desirable to provide methods for analyzing USB data traffic using a USB analyzer on a single USB host controller by automatically filtering the USB data traffic.

SUMMARY OF INVENTION

An object of this invention is to provide methods for recognizing packets received on a monitor port intended for an analyzer's device address and then discarding those packets.

Another object of this invention is to provide methods for analyzing USB data traffic without requiring the analyzer to be on a separate bus or requiring a manually configured filter.

Yet another object of this invention is to provide methods for an easy and maintainable interface for a user of an analyzer to automatically filter USB traffic.

Briefly, USB data traffic for a monitored device is captured by a USB analyzer, wherein the monitored device and the USB analyzer utilize only one USB host controller, comprising the steps of: storing an analyzer address associated with the USB analyzer and the speed of the analyzer's communication port; reading a USB packet; and filtering the read packet as a function of the stored analyzer address and its communication speed.

An advantage of this invention is that methods for recognizing packets received on a monitor port intended for an analyzer's device address and then discarding those packets are provided.

Another advantage of this invention is that methods for analyzing USB data traffic without requiring the analyzer to be on a separate bus or requiring a manually configured filter are provided.

Yet another advantage is that methods for an easy and maintainable interface for a user of an analyzer to automatically filter USB traffic are provided.

DESCRIPTION OF THE DRAWINGS

The foregoing and other objects, aspects, and advantages of the invention will be better understood from the following detailed description of the preferred embodiment of the invention when taken in conjunction with the accompanying drawings in which.

DETAILED DESCRIPTION OF THE PREFERRED EMBODIMENTS

Presently preferred embodiments of the present invention provide methods for effectively monitoring USB data traffic on a single USB host controller by implementing a preferably hardware based filter that removes packets from a monitor port intended for the analyzer. These packets are removed in order to minimize the load on the capture buffers. Furthermore, a graphical interface for this filter is provided to greatly simplify the use of the analyzer. To apply this filter, the graphical interface can have a check box to enable this filter, a mechanism to call a single function with a single constant in a programming API, or other user interface mechanisms to enable this filter. This filter can remain valid and functional so long as the settings are saved, even if the device address of the analyzer changes.

In the preferred embodiment of the present invention, the filtering mechanism also takes into account the speed of the monitored bus. The USB protocol is defined in such a way that on a single host controller the device address space (meaning the set of possible device addresses) of full-speed (FS) and low-speed (LS) communication is separate to that of high-speed (HS). Therefore, it is possible for HS devices to have the same device address of FS or LS devices on the same host controller. Unintentional filtering can therefore occur when the analyzer is connected to a HS bus and monitoring FS/LS devices on a single host controller, or vice-versa. Therefore the speed of the monitored bus should be checked against the speed of the communication bus.

For example, if the analyzer's device address is set to 0x01 and it is communicating at HS, it is possible that a FS device being monitored will also have a device address of 0x01, even if on the same host controller. If self-filtering was enabled, and the speed of the bus was not taken into account, then the user would not see any monitored traffic (as all packets would match that device address and be filtered out). Therefore, to aid in this situation the analyzer would take into account its own communication speed and that of the monitored bus. Only if the device address and the speed of communication match would the packet would be filtered out.

The speed of the monitor port would be detected automatically through mechanisms not relevant to this invention. The speed of communication port is determined before the capture begins. It could therefore be automatically detected by the analyzer, or transmitted to the analyzer through other mechanisms during the capture start-up process.

Using this mechanism, users could safely analyze USB with a single host controller, even as they test multiple devices of any speed, during a single capture.

Figure 1:
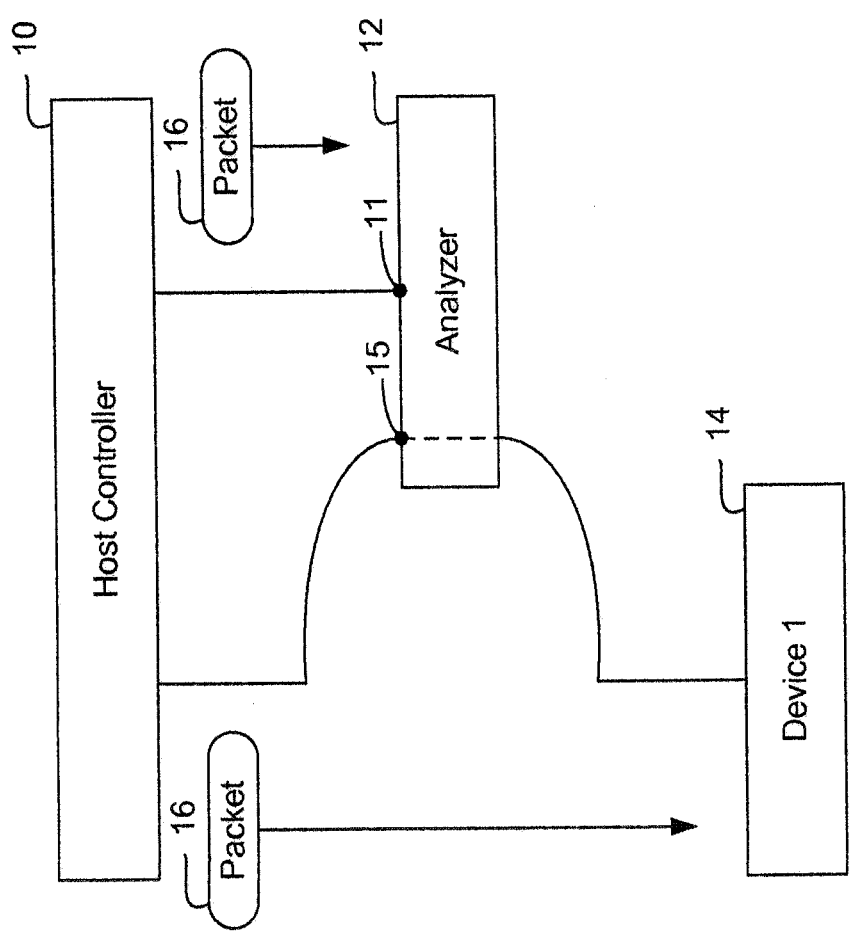
FIG. 1 illustrates a typical setup for connecting an analyzer to a USB system, wherein the analyzer and a device are connected to the same host controller.
Figure 2:
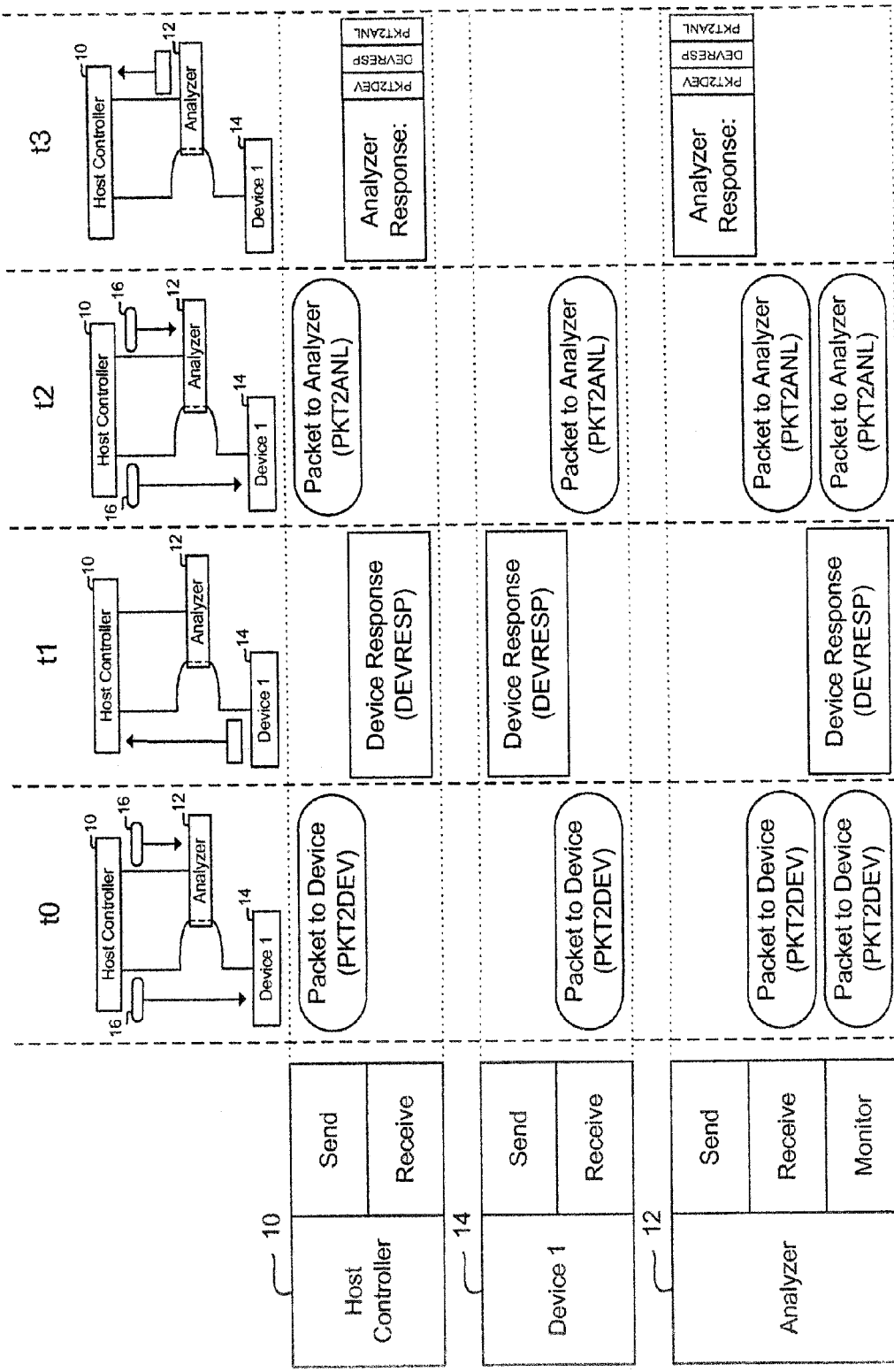
FIG. 2 illustrates USB data traffic at various times for an analyzer and a device connected to the same host controller.
Figure 3A:
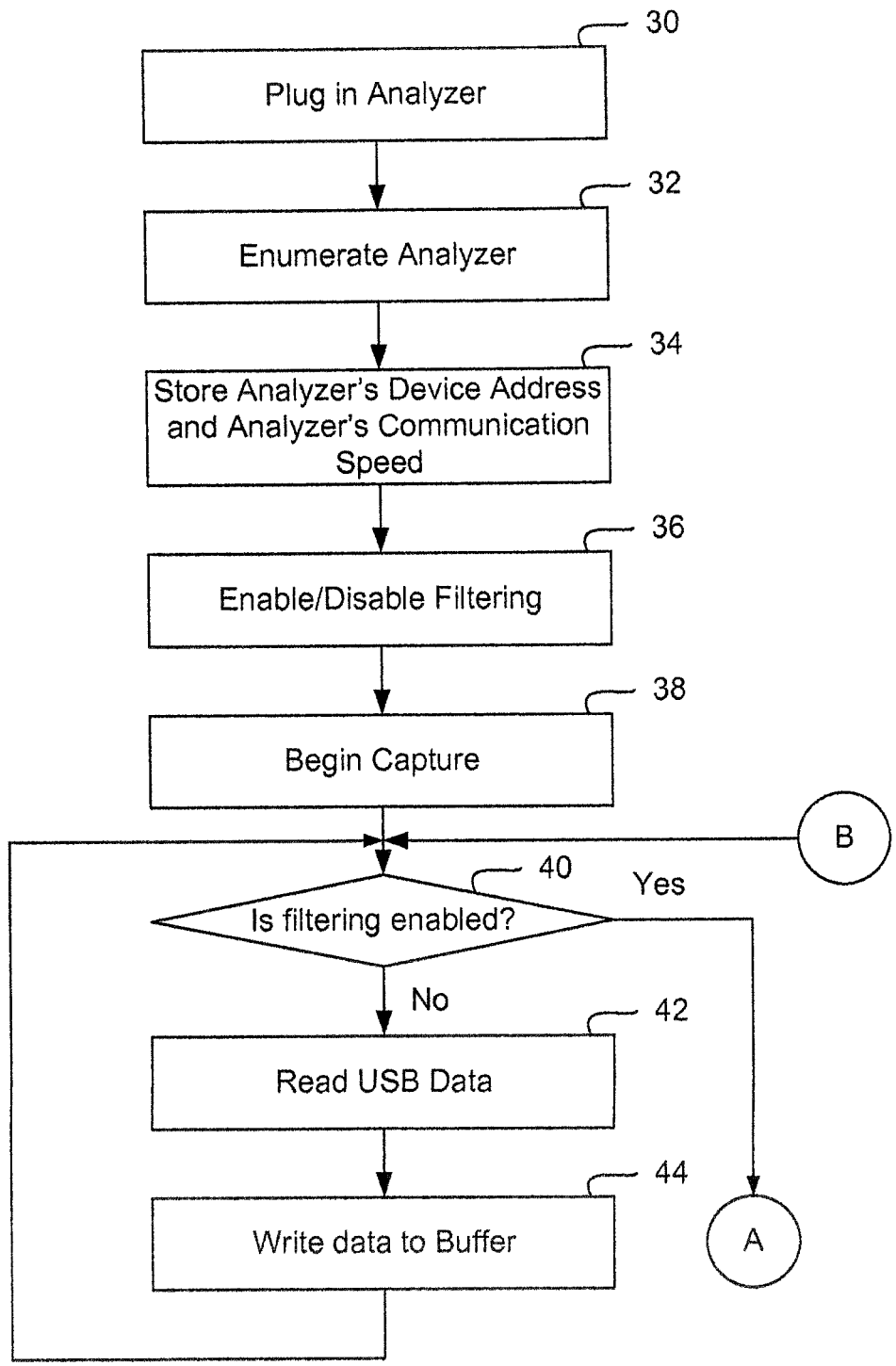
FIGS. 3a-3b illustrate a flow chart for a preferred embodiment of the invention for capturing USB data traffic for an analyzer and a device connected to the same host controller.
Figure 3B:
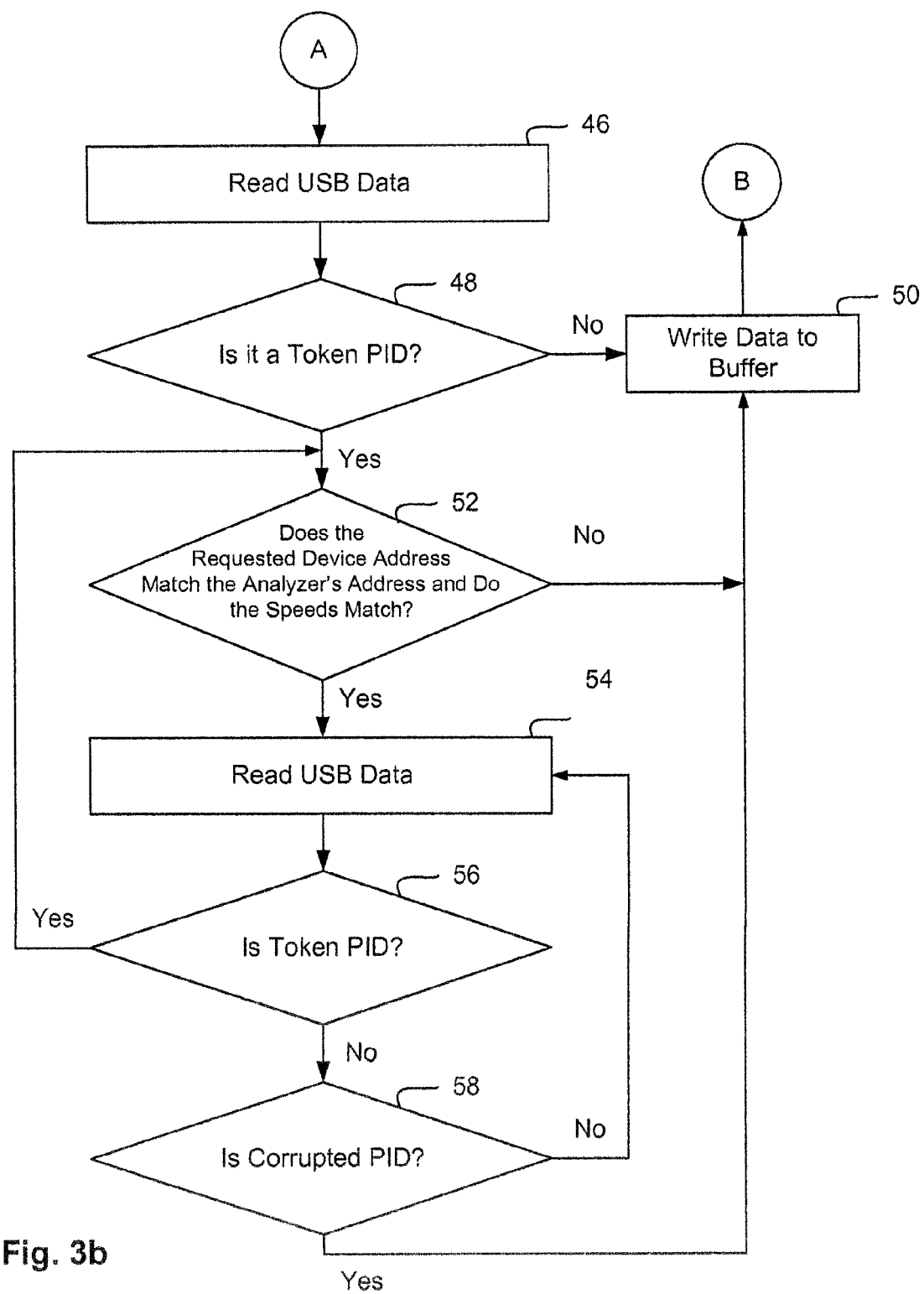

FIGS. 3a-3b illustrate a flow chart for a preferred embodiment of the invention for capturing USB data traffic for an analyzer and a device on the same host controller. When an analyzer is connected to a host controller via a USB cable 30, the analyzer is enumerated 32. During the enumeration 32, the host controller allocates an address to the analyzer in order to prepare for transmission of data to the analyzer and for the reception of data from the analyzer.

Upon enumeration of the USB analyzer 32, the analyzer stores its address for future use 34, as well as its communication speed. In an alternative embodiment, the analyzer's device address does not need to be stored upon enumeration. It can also be determined by the analysis computer, and then transmitted to the analyzer upon starting the capture of USB data traffic. Similarly, the analyzer's communication speed could be configured the same way.

The analyzer can then be configured with a single input from the user via a user interface to enable (or disable) the filtering of packets intended for the analyzer's device address 36.

When the capture is started 38, the analyzer checks if the filtering of its device address is enabled 40. The analyzer can check if the filter is enabled at the beginning of the USB data capture, or, alternatively, it can check whether the filter is enabled at the reception of each packet.

If the filter is not enabled 40, then the analyzer allows all packets through to the rest of the system. The analyzer will continuously read USB data from the stream 42, write it to the buffer 44, and check again to see if filtering is enabled 40.

If the filter is enabled 40, then special filtering techniques can be used to remove those packets intended for the analyzer from the captured data stream. In one example of such special filtering techniques, each packet in the USB data traffic is read 46 to determine whether it is a Token packet identifier 48 (herein referred to as a "Token PID"). If it is not a Token PID 48, or it is a Token PID that does not match the analyzer's device address 52 or if the speed does not match, then the analyzer writes the data to an outbound buffer 50, and reads the next piece of USB data 40. In comparing the speed of the communication port and the monitor port, they are considered matched if the communication port is HS and the monitor port is HS, or if the communication port is not HS and the monitor port is not HS.

However, if the packet is a Token PID 48 that matches the analyzer's device address 52 and the communication speed of the analyzer, then the analyzer does not write that data to the outbound buffer. Instead, it transitions to a new state and reads the next piece of USB data 54. Once in this new state, the analyzer will not write any of the new USB data into the buffer until a new Token PID is received that does not match the analyzer's device address (since all interim non-Token packets are taken to be intended for the analyzer).

After the next piece of USB data is read, the analyzer determines whether the read USB data is a Token PID 56. If the data is a Token PID, then the requested device address in the Token PID is compared to the analyzer's address and speed to determine if the addresses match 52. If the addresses and speed do not match, then the data is written to the buffer 50. If the addresses and speed match, the analyzer does not write that data to the outbound buffer, and the next USB data is read 54.

If the read USB data is not a Token PID, then it is determined whether the data is a corrupted PID 58. If the data is a corrupted PID, then the data is written to the buffer 50. If the data is not a corrupted PID, then the next USB data is read 54.

In an alternative embodiment, the analyzer can filter only a subset of packets (e.g., those packets only matching certain packet types) intended for its device address.

The data in the buffer is then transmitted to the analysis computer via the host controller and thereby the USB traffic to the device can be seen on the analysis computer and analyzed. As a general case, data to the analyzer itself would be filtered out; and, as an option, traffic to the analyzer can also be transmitted to the analysis computer if so desired.

It is important to note that other products and technologies employ display filters to aid with the visualization of the data. This is not to be confused with the type of filtering presented by this invention. Display filters work only on already captured data, and only filter what has already been downloaded to the analysis computer. This invention filters the packets before they reach the capture buffer: thus, reducing the hardware buffer usage, the load on the analysis computer, and the intrusiveness of the analyzer. Display filters cannot prevent the capture buffer from being overloaded and exhausted by the unnecessary traffic described previously.

While the present invention has been described with reference to certain preferred embodiments or methods, it is to be understood that the present invention is not limited to such specific embodiments or methods. Rather, it is the inventor's contention that the invention be understood and construed in its broadest meaning as reflected by the following claims. Thus, these claims are to be understood as incorporating not only the preferred methods described herein but all those other and further alterations and modifications as would be apparent to those ordinary skilled in the art.

We Claim:

1. A method for capturing universal serial bus (USB) data traffic for a monitored device by a USB analyzer, comprising:
reading a USB packet; and
filtering USB data read from the USB packet at least in part based on whether the read USB data is associated with a USB packet comprising a target address that is equal to a stored analyzer address, and whether a first communication speed associated with the monitored device matches with a second communication speed associated with the USB analyzer.

2. The method of claim 1, further comprising: transmitting the filtered USB data to an analysis computer.

3. The method of claim 1, wherein the monitored device and the USB analyzer utilize a same USB host controller.

4. The method of claim 3, wherein the filtering further comprising:
if the USB packet comprises a token packet identifier and if the token packet identifier has a target address not equaling to the analyzer address, storing the USB packet.

5. The method of claim 3, wherein the filtering further comprising:
if the USB packet comprises a token packet identifier and if the token packet identifier has a target address equaling to the analyzer address, discarding the USB packet.

6. The method of claim 3, wherein the filtering further comprising: if the USB packet comprises a corrupted packet identifier, storing the USB packet.

7. The method of claim 3, wherein the USB analyzer has a pass-through buffer and if a token packet identifier has a target address not equaling to the analyzer address, the USB packet is stored in the pass-through buffer of the USB analyzer.

8. The method of claim 3, wherein a graphical user interface is provided for enabling or disabling the filtering.

9. The method of claim 3, wherein the filtering is performed as a function of a packet type of the read USB packet.

10. A USB analyzer for capturing universal serial bus (USB) data traffic for a monitored device, comprising:
a processor configured to:
read a USB packet; and
filter USB data read from the USB packet at least in part based on whether the read USB data is associated with a USB packet comprising a target address that is equal to a stored analyzer address, and whether a first communication speed associated with the monitored device matches with a second communication speed associated with the USB analyzer; and
a memory coupled to the processor and configured to provide the processor with instructions.

11. The USB analyzer of claim 10, wherein the processor is further configured to: transmit the filtered USB data to an analysis computer.

12. The USB analyzer of claim 10, wherein the monitored device and the USB analyzer utilize a same USB host controller.

13. The USB analyzer of claim 12, wherein the processor is further configured to:
if the USB packet comprises a token packet identifier and if the token packet identifier has a target address not equaling to the analyzer address, store the USB packet.

14. The USB analyzer of claim 12, wherein the processor is further configured to:
if the USB packet comprises a token packet identifier and if the token packet identifier has a target address equaling to the analyzer address, discard the USB packet.

15. The USB analyzer of claim 12, wherein the processor is further configured to: if the USB packet comprises a corrupted packet identifier, store the USB packet.

16. The USB analyzer of claim 12, wherein the USB analyzer has a pass-through buffer and if a token packet identifier has a target address not equaling to the analyzer address, the USB packet is stored in the pass-through buffer of the USB analyzer.

17. The USB analyzer of claim 12, further comprising a graphical user interface for enabling or disabling the filtering.

18. The USB analyzer of claim 12, wherein the filtering is performed as a function of a packet type of the read USB packet.

19. The USB analyzer of claim 10, wherein filtering comprises:
- if the USB packet comprises a token packet identifier, and if the token packet identifier has a target address that is equal to the stored analyzer address, and if the first communication speed associated with the monitored device matches with the second communication speed associated with the USB analyzer, entering a state in which one or more subsequent read USB packets are discarded.

20. The USB analyzer of claim 19, wherein the state is exited in the event that a new token packet identifier is received and that the new token packet identifier has a target address that is not equal to the stored analyzer address.

21. The USB analyzer of claim 10, wherein the analyzer address is assigned by an analysis computer having a USB host controller.

\* \* \* \* \*